US011849882B2

(12) United States Patent
Chun et al.

(10) Patent No.: US 11,849,882 B2
(45) Date of Patent: *Dec. 26, 2023

(54) COOKER WITH GASKET (71) Applicant: LG ELECTRONICS INC., Seoul (KR)

(72) Inventors: Young Chun, Seoul (KR); Euisu Jung, Seoul (KR); Jeonghoon Lee, Seoul (KR); Sangkyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 222 days.

This patent is subject to a terminal disclaimer.

(21) Appl. No.: 17/315,732

(22) Filed: May 10, 2021

(65) Prior Publication Data
US 2021/0259463 A1    Aug. 26, 2021

Related U.S. Application Data (63) Continuation of application No. 16/456,146, filed on Jun. 28, 2019, now Pat. No. 11,045,045, which is a
(Continued)

(30) Foreign Application Priority Data

Sep. 2, 2015    (KR) .......................... 10-2015-0124503

(51) Int. Cl.
*F24C 15/08*    (2006.01)
*A47J 37/06*    (2006.01)
(Continued)

(52) U.S. Cl.
CPC ........... *A47J 37/0629* (2013.01); *F24C 15/08* (2013.01); *F24C 15/14* (2013.01); *F28F 9/0226* (2013.01);
(Continued)

(58) Field of Classification Search
CPC ....... A47J 37/0629; F24C 15/08; F24C 15/10; F24C 15/36; F24C 15/14; F16S 5/00; F28F 9/0226; F28F 9/165
(Continued)

(56) References Cited

U.S. PATENT DOCUMENTS 2,075,108 A    3/1937  Frick
2,328,757 A    9/1943  Tinnerman
(Continued)

FOREIGN PATENT DOCUMENTS

CN    101336354    12/2008
CN    104067057    9/2014
(Continued)

OTHER PUBLICATIONS

Korean Office Action dated Aug. 9, 2016.
(Continued)

*Primary Examiner* — Steven B McAllister
*Assistant Examiner* — Daniel E. Namay
(74) *Attorney, Agent, or Firm* — KED & ASSOCIATES (57) ABSTRACT A cooker with a gasket may include a top plate on which a plurality of burners may be placed; a manifold panel provided in front of the top plate and including thereon a plurality of knobs to control output powers of the plurality of burners; and a gasket that extends along a front end of the top plate and is compressed between the top plate and the manifold panel to hermetically seal the top plate and the manifold panel.

20 Claims, 9 Drawing Sheets

Related U.S. Application Data continuation of application No. 15/254,028, filed on Sep. 1, 2016, now Pat. No. 10,376,098.

(51) Int. Cl.

| | | |
|---|---|---|
| *F24C 15/14* | (2006.01) | |
| *F28F 9/16* | (2006.01) | |
| *F28F 9/02* | (2006.01) | |
| *F24C 15/10* | (2006.01) | |
| *F16S 5/00* | (2006.01) | |

(52) U.S. Cl.
CPC .............. *F28F 9/165* (2013.01); *F16S 5/00* (2013.01); *F24C 15/10* (2013.01)

(58) Field of Classification Search
USPC ............................... 126/214 D, 37 R, 214 B
See application file for complete search history.

(56) References Cited

U.S. PATENT DOCUMENTS

| | | | |
|---|---|---|---|
| 3,166,064 | A | 1/1965 | Waltman |
| 5,095,657 | A | 3/1992 | Marsh |
| 5,568,804 | A | 10/1996 | Joseph |
| 5,640,947 | A | 6/1997 | Shute |
| 6,175,102 | B1 | 1/2001 | Stedron |
| 7,401,610 | B1 * | 7/2008 | Cherry .................... F16K 35/10 126/211 |
| 8,397,708 | B2 * | 3/2013 | Tremblay .............. F24C 15/102 126/214 B |
| 10,376,098 | B2 * | 8/2019 | Chun ..................... F24C 15/08 |
| 11,045,045 | B2 * | 6/2021 | Chun .................. A47J 37/0629 |
| 2003/0001344 | A1 | 1/2003 | Bono, Jr. et al. |
| 2005/0194004 | A1 | 9/2005 | Boswell |
| 2008/0283034 | A1 | 11/2008 | Graven |
| 2011/0197871 | A1 | 8/2011 | Reuter |
| 2011/0309065 | A1 | 12/2011 | Neukamm |
| 2013/0104874 | A1 | 5/2013 | Jung |
| 2014/0021196 | A1 | 1/2014 | Hoffmann |
| 2014/0311473 | A1 | 10/2014 | Hofmann et al. |
| 2015/0192303 | A1 | 7/2015 | Je et al. |
| 2015/0201465 | A1 | 7/2015 | Adelmann |
| 2016/0187003 | A1 | 6/2016 | Wojcik |
| 2016/0327276 | A1 | 11/2016 | Lee |
| 2016/0334113 | A1 | 11/2016 | Lee |

FOREIGN PATENT DOCUMENTS

| | | | |
|---|---|---|---|
| DE | 91 06 359 | | 9/1991 |
| DE | 102004020181 A1 * | 11/2005 | ............ F24C 15/003 |
| EP | 0061036 | | 9/1982 |
| EP | 0 641 975 | | 3/1995 |
| EP | 2 866 519 | | 4/2015 |
| GB | 2 076 530 | | 12/1981 |
| GB | 2177790 | | 1/1987 |
| GB | 2 311 365 | | 9/1997 |
| JP | 51-054771 | | 4/1976 |
| JP | 61-141617 | | 9/1986 |
| JP | 61-172912 | | 10/1986 |
| JP | 3208339 | | 7/2001 |
| JP | 2002-162043 | | 6/2002 |
| JP | 2006-275450 | | 10/2006 |
| JP | 2012-093019 | | 5/2012 |
| KR | 20-1986-0015085 | | 12/1986 |
| KR | 20-0196870 | | 9/2000 |
| KR | 10-2010-0122016 | | 11/2010 |
| KR | 10-2015-0081972 | | 7/2015 |
| WO | WO 2005/024307 | | 3/2005 |

OTHER PUBLICATIONS

European Search Report dated Dec. 22, 2016.
Chinese Office Action dated Apr. 4, 2018.
European Search Report dated Mar. 20, 2017 issued in Application No. 16186968.0.
U.S. Office Action issued in U.S. Appl. No. 15/254,028 dated Jun. 28, 2018.
U.S. Office Action issued in U.S. Appl. No. 15/254,028 dated Dec. 13, 2018.
WO_2005024307 "Certified Translation.pdf", United States Patent and Trademark Office/Schreiber Translations, Inc., Jul., 2018, (Year 2018).
"JP_2004007293-Machine Translation.pdf", machine translation of WO 2005/024307-A1-M, World Intellectual Property Organization, Jun. 8, 2018.
"DE_9106359_U1_M-Machine Translation.pdf", machine translation, EPO.org, Jun. 20, 2018.
U.S. Notice of Allowance issued in U.S. Appl. No. 15/254,028 dated Mar. 29, 2019.

\* cited by examiner

COOKER WITH GASKET

CROSS-REFERENCE TO RELATED APPLICATIONS

This application is a Continuation Application of U.S. application Ser. No. 16/456,146 filed Jun. 28, 2019, which is a Continuation Application of U.S. application Ser. No. 15/254,028 filed Sep. 1, 2016, which claims priority under 35 U.S.C. § 119 to Korean Patent Application No. 10-2015-0124503, filed in Korea on Sep. 2, 2015, whose entire disclosures are hereby incorporated by reference.

BACKGROUND

1. Field

A cooker with a gasket is disclosed herein.

2. Background

In general, cookers are a type of kitchen utensil, whereby food or other items are cooked by heating the food using a heating source. The cookers may be largely classified into an electric cooker, which heats food using electricity, and a gas cooker, which heats food using heat generated by burning a gas, according to a type of a heat source for heating food.

The electric cooker uses either a heater that generates heat from electricity supplied thereto as a heat source for heating food or an induction heating method using a working coil. The gas cooker uses a burner that generates heat by combusting a gas supplied thereto as a heat source for heating food.

Representative examples of the gas cooker are a gas range, in which at least one burner is provided on a top surface thereof and a container that accommodates food is placed on a top of the burner, and a gas oven range, in which a burner is provided in a top thereof to form a cooktop unit or cooktop and an oven unit or oven, which is a closed cooking space, is integrally formed with the bottom of the cooktop unit.

Korean Patent Publication No. 10-2010-0122016, which is hereby incorporated by reference, discloses a cooker in which a cooktop unit configured as a closed burner is formed on a top thereof, an oven unit including an oven chamber opened/closed by an oven door is formed below the cooktop unit, and a control unit or controller configured to control driving of the cooker is provided in front of the cooktop unit and above the oven unit, and coupled to the cooktop unit to be in contact with a front end of the cooktop unit. However, in the above structure, a connection unit or connector is formed between the control unit and the cooktop unit. Thus, when a foreign substance generated when food is cooked at the cooktop unit boils over from the cooktop unit, the foreign substance may penetrate an inside of the control unit or a gap in the connection unit between the control unit and the cooktop unit, and thus, flow into the oven chamber.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to embodiments, examples of which are illustrated in the accompanying drawings. The embodiments may, however, be embodied in many different forms and should not be construed as being limited to the embodiments set forth herein; rather, alternative embodiments falling within the spirit and scope can easily be derived through adding, altering, and removing, and will fully convey the concept to those skilled in the art.

Figure 1:
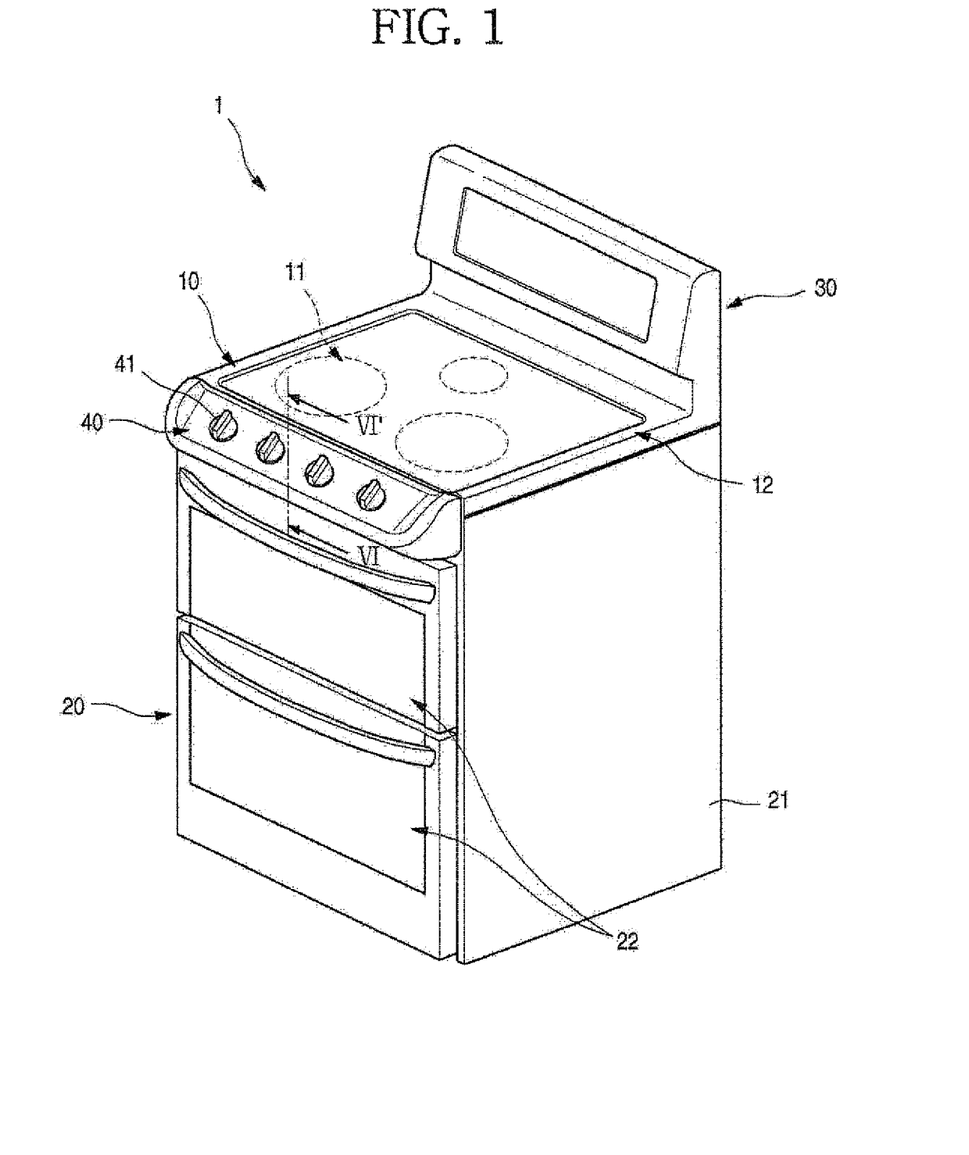
FIG. 1 is a perspective view of a cooker according to an embodiment.

FIG. 1 is a perspective view of a cooker according to an embodiment. As illustrated in FIG. 1, an exterior of a cooker 1 with a gasket 50 according to an embodiment may include a cooktop unit or cooktop 10, an oven unit or oven 20, and an exhaust unit or exhaust 30.

The cooktop 10 may form a top of the cooker 1 and may be configured such that food or other items to be cooked or heated is placed and cooked thereon. The cooktop 10 may include a plurality of burners 11. Knobs 41 on a manifold panel 40 provided on or at a front end of the cooktop 10 may be manipulated to control output powers of the plurality of burners 11.

The plurality of burners 11 may be provided on the cooktop 10, and may be configured as closed burners embedded in the cooktop 10 to be shielded by a top plate 12, as illustrated in FIG. 1. Alternatively, the plurality of burners 11 may be configured as open-flame type burners, flames of which may be exposed to the outside. Alternatively, the plurality of burners 11 may be configured to heat food by electricity rather than a gas if necessary.

The exhaust 30 may be formed at a rear end of the cooktop 10. The exhaust 30 may be configured to discharge an exhaust gas generated from the cooktop 10 and/or the oven 20 to the outside, and may extend in an upward direction from a rear end of the cooker 1, so that hot heat or a burning gas generated during cooking of food may not be delivered to a user.

The oven 20 may be provided under the cooktop 10. An exterior of the oven 20 may be formed by a case 21. A cavity plate (not shown) forming a space in which food may be accommodated and cooked may be provided inside of the oven 20. Oven doors 22 may be provided on a front surface of the oven 20, by which the space formed by the cavity plate may be opened and closed.

The oven 20 may include a plurality of spaces to be opened and closed by the oven doors 22 corresponding thereto. Food may be cooked using a gas in one of the plurality of spaces of the oven 20, and cooked using electricity in the other space. Alternatively, the oven 20 may have a single structure, in which simple storage spaces may be respectively and additionally formed in an upper portion and a lower portion of the oven 20.

The oven doors 22 may be rotatably moved to open and close the plurality of spaces formed in the oven 20, and may be configured as a drawer type such that the oven 20 may be opened by pulling out the oven doors 22 and closed by pushing the oven doors 22, if necessary.

The oven 20 may be operated through the knobs 41 on the manifold panel 40. Alternatively, the oven 20 may be operated through touch-type manipulation means other than the knobs 41.

Figure 2:
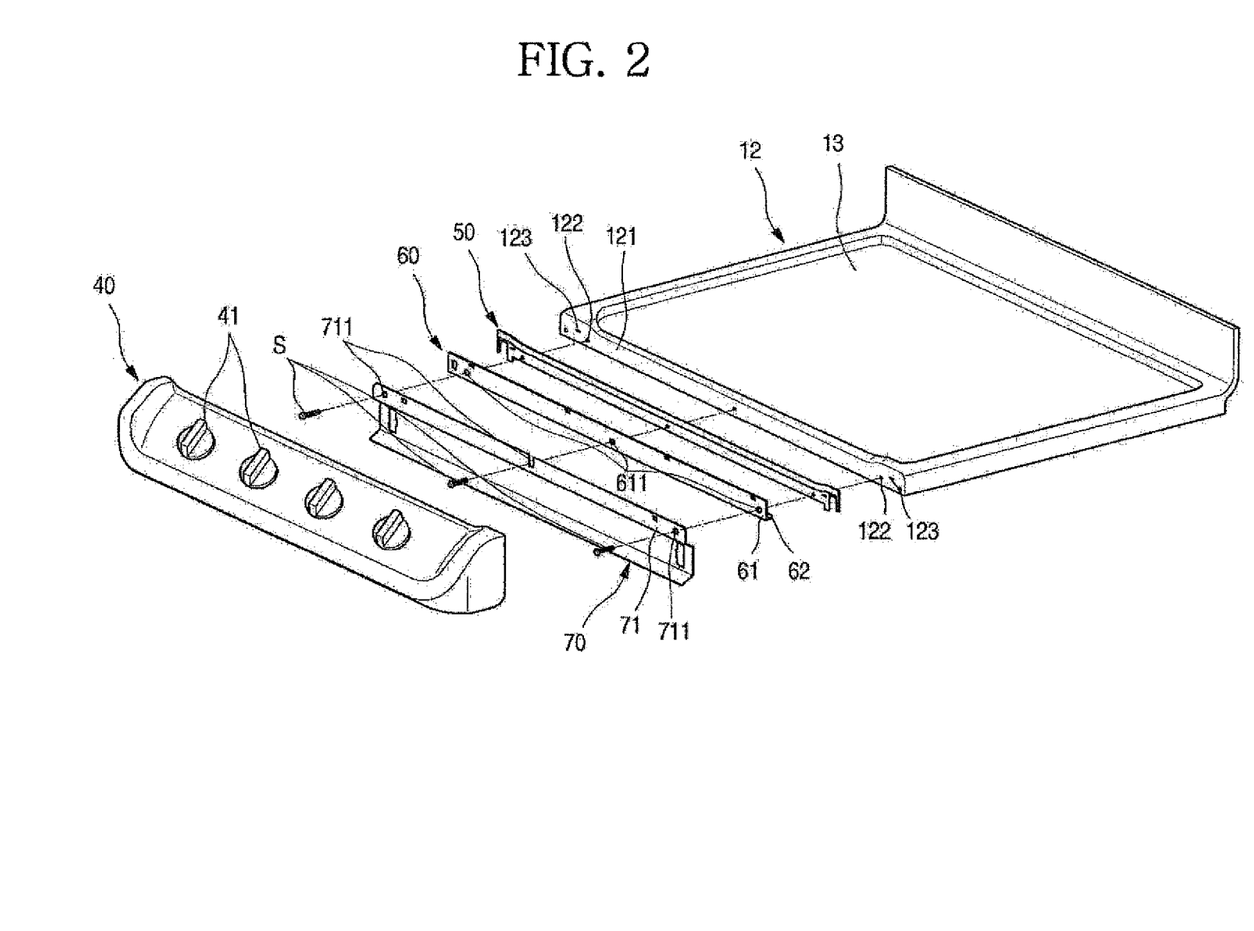
FIG. 2 is an exploded perspective view of a structure in which a top plate and a manifold panel of the cooker of FIG. 1 are coupled to each other.
Figure 3:
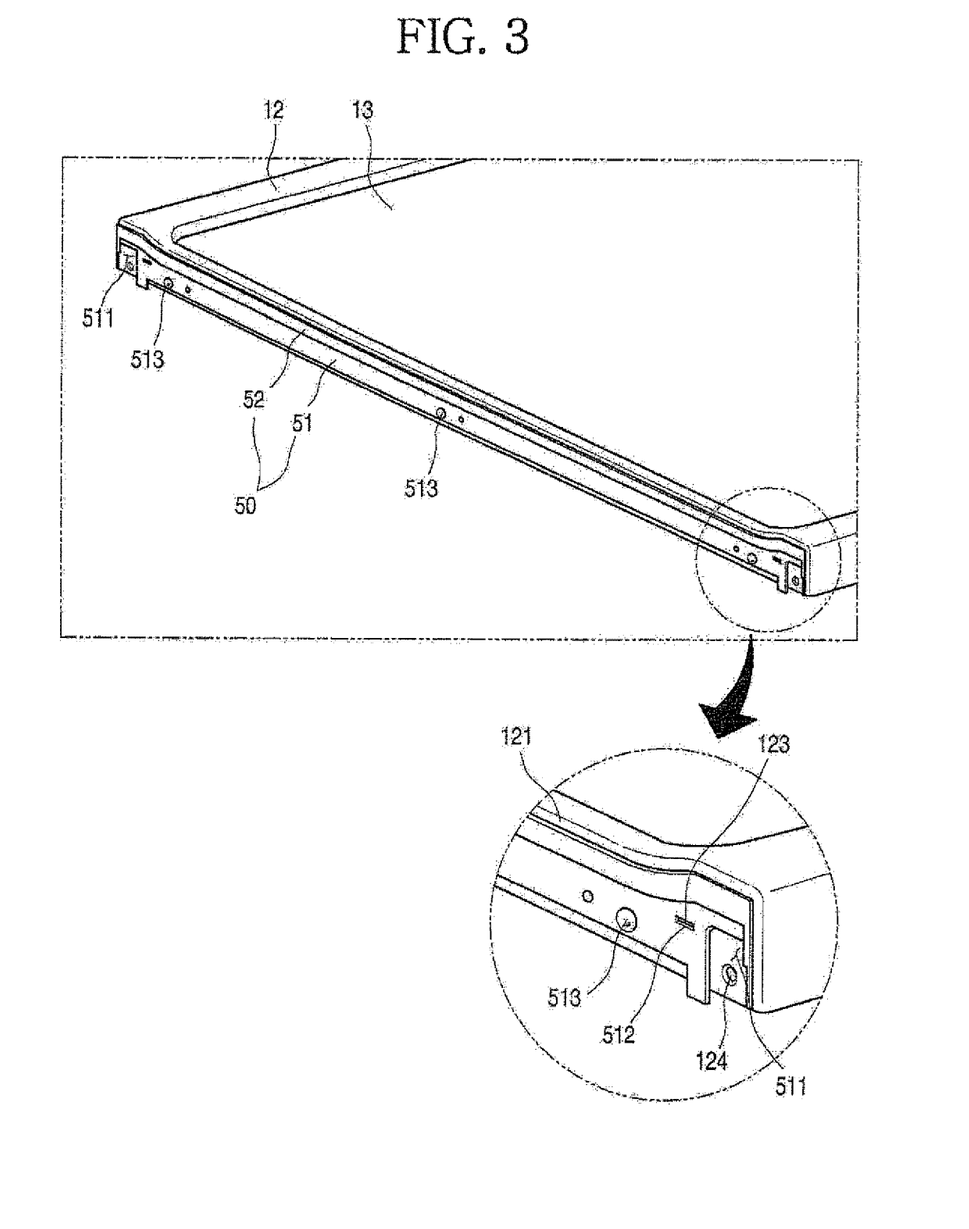
FIG. 3 is a partial perspective view of a state in which a gasket is mounted on the top plate of FIG. 2.

FIG. 2 is an exploded perspective view of a structure in which a top plate and a manifold panel of the cooker of FIG. 1 are coupled to each other. FIG. 3 is a partial perspective view of a state in which a gasket is mounted on the top plate of FIG. 2.

As illustrated in FIG. 2, a top surface of the cooker 1, that is, a top surface of the cooktop 10, may be configured by the top plate 12. The manifold panel 40 including the knobs 41 may be coupled to a front end of the top plate 12. The gasket 50, a drain-pan bracket 60, and a barrier 70, for example, may be provided between the top plate 12 and the manifold panel 40.

The top plate 12 may form an exterior of the cooktop 10 and may be formed in a plate shape using a metal material. A circumferential portion of the top plate 12 may be bent downward to form a circumferential shape of the cooktop 10, and may be in contact with or coupled to the manifold panel 40 and the case 21. Although not shown, the plurality of burners 11 may be provided in a space formed by the top plate 12, and a gas pipe line and various valves connected to the plurality of burners 11 may be provided in this space.

A top surface of the top plate 12 may be formed of ceramic glass 13. The plurality of burners 11 may be provided at a bottom surface of the ceramic glass 13, and a container having food to be cooked therein may be placed on a top surface of the ceramic glass 13 to be heated by the plurality of burners 11.

A plurality of coupling holes 122 may be formed in a front surface 121 of the top plate 12 to couple the top plate 12 to the barrier 70 and the drain-pan bracket 60. Case coupling holes 124 may be further formed in both of first and second (left and right in the drawing) sides of the front surface 121 of the top plate 12, whereby the top plate 12 may be coupled to the case 21. The top plate 12 and the case 21 may be coupled to each other via a coupling member engaged with the case coupling holes 124.

A plurality of fixing protrusions 123 may be formed in the front surface 121 of the top plate 12 to fix the gasket 50. The plurality of fixing protrusions 123 may be formed at regular intervals along the front surface 121 of the top plate 12.

The gasket 50 may be mounted on the front surface 121 of the top plate 12. The gasket 50 may hermetically seal the top plate 12 and the manifold panel 40, and may extend in a lengthwise direction of the front surface 121 of the top plate 12.

Figure 4:
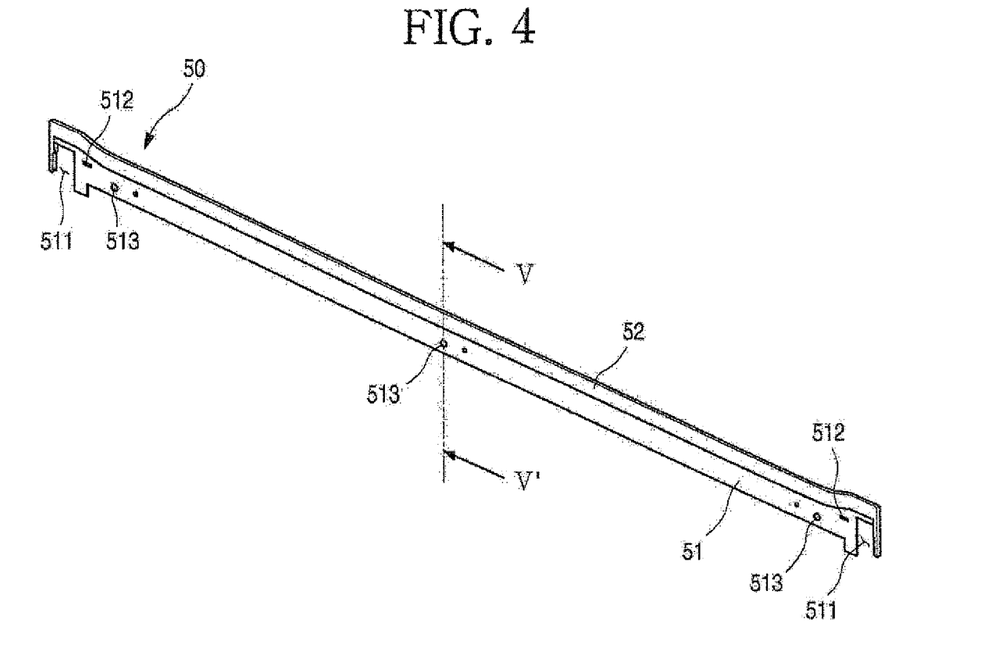
FIG. 4 is a perspective view of the gasket of FIG. 3.
Figure 5:
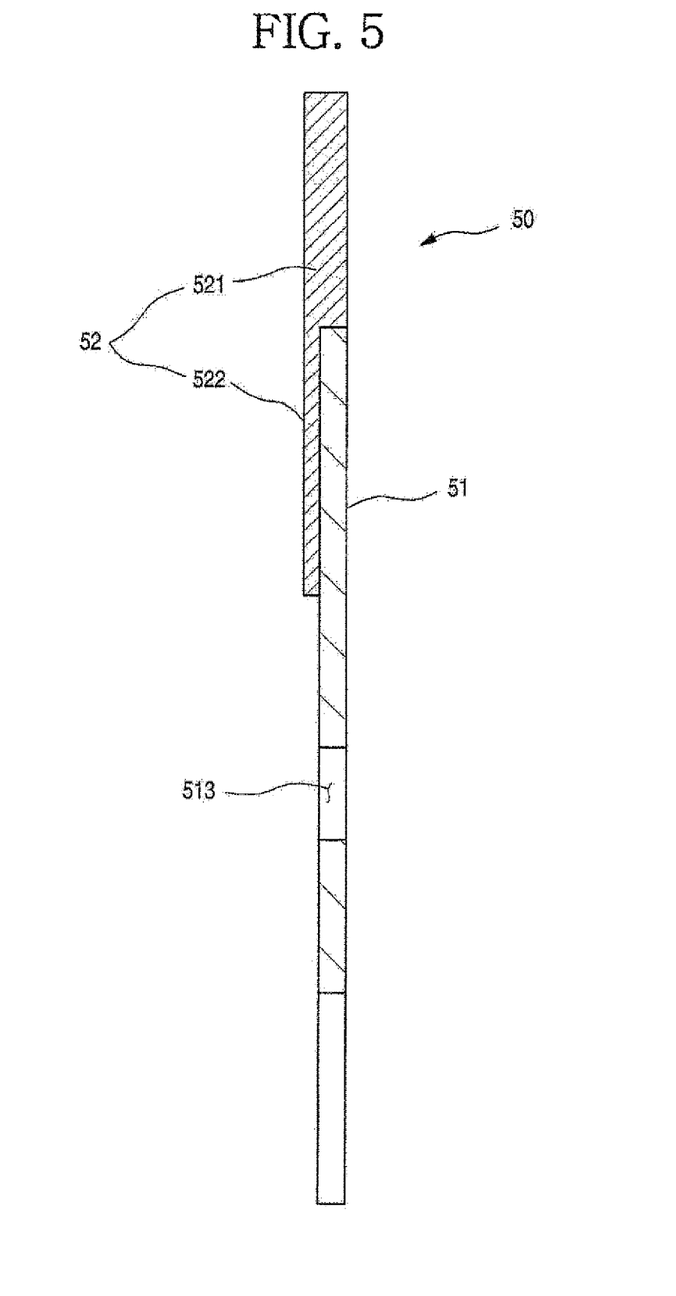
FIG. 5 is a cross-sectional view taken along line V-V' of FIG. 4.

FIG. 4 is a perspective view of the gasket of FIG. 3. FIG. 5 is a cross-sectional view taken along line V-V' of FIG. 4.

The structure of the gasket 50 will be described with reference to FIGS. 4 and 5. The gasket 50 may include a support plate 51 closely adhered to the front surface 121 of the top plate 12 and extending in a lengthwise direction of the gasket 50, and a close-contact member 52 provided on a top end of the support plate 51.

The support plate 51 may be formed in a plate shape and have a vertical width and a horizontal length such that it is located in an inner region of the front surface 121. A rear surface of the support plate 51 may be in contact with the front surface 121 of the top plate 12, and a front surface thereof may be in contact with the drain-pan bracket 60.

The close-contact member 52 may be formed along a top end and first and second (left and right in the drawing) side ends of the support plate 51. The close-contact member 52 may be formed of a compressible material, such as rubber, silicon, or urethane, for example, and may hermetically seal the front surface 121 of the top plate 12 when the close-contact member 52 forming a top of the gasket 50 is mounted.

In particular, the close-contact member 52 may be formed along the top end and the first and second (left and right in the drawing) side ends of the gasket 50 to hermetically seal a portion of the top plate 12 which may be exposed to the outside. The close-contact member 52 may be thicker than the support plate 51, so that the close-contact member 52 may be compressed to effectively seal the front surface 121 of the top plate 12.

The close-contact member 52 may include a close-contact portion 521, which may be closely adhered to the front surface 121 of the top plate 12, and an adhesive portion 522, which may extend from a bottom end of the close-contact portion 521 and be adhered to the support plate 51. The adhesive portion 522 may be thinner than the close-contact portion 521 and be adhered to a front surface of the support plate 51 while being in surface contact with the front surface of the support plate 51.

Thus, the close-contact member 52 may be configured to be placed or located on the support plate 51 through the bottom end of the close-contact portion 521 and the adhesive portion 522. Thus, the close-contact member 52 may be firmly adhered to the support plate 51. Alternatively, the close-contact member 52 may be molded according to an insert-injection method so that the support plate 51 may be coupled to the close-contact member 52 during injection molding of the close-contact member 52.

Evacuation units or cut-outs 511 may be formed in the first and second sides of the support plate 51, with which a coupling member configured to couple the case 21 and the top plate 12 to each other may be engaged. The coupling member may be screws S to be coupled to the manifold panel 40 or the drain-pan bracket 60 other than the case 21.

Fixing holes 512 may be formed in the support plate 51, into which the plurality of fixing protrusions 123 that protrudes from the front surface 121 of the top plate 12, may be inserted. Thus, the gasket 50 may be fixed on the top plate 12 by coupling the plurality of fixing protrusions 123 to the fixing holes 512 before the screws S are engaged to fix the gasket 50.

Further, a plurality of screw holes 513 may be formed in the support plate 51. The plurality of screw holes 513, with which the screws S passing through the drain-pan bracket 60 and the barrier 70 as well as the gasket 50 may be engaged, may be formed in a lengthwise direction of the support plate 51.

The drain-pan bracket 60 may be provided in front of the gasket 50. Further, the drain-pan bracket 60 may be formed by bending a plate type metal material a plurality of times.

The drain-pan bracket 60 may include a contact portion 61, which may be in surface contact with the gasket 50, and a drain-pan portion 62, which may be bent from a bottom end of the contact portion 61 in a rearward direction. The contact portion 61 may be formed to be longer than a vertical width of the gasket 50, so that it may be closely adhered to a front surface of the gasket 50. Further, through-holes 611, through which the screws S may pass to fix the gasket 50, may be formed in the drain-pan bracket.

The drain-pan portion 62 may be formed by bending the bottom end of the contact portion 61 in the rearward direction and bending it again in an upward direction to collect water penetrating or falling between the drain-pan bracket 60 and the gasket 50. The drain-pan portion 62 may extend to both of first and second (left and right in the drawing) side ends of the top plate 12, and thus, water collected in the drain-pan portion 62 may flow to the first and second sides of the top plate 12, thereby preventing the water from flowing into the oven 20.

The barrier 70 may be attached to a rear surface of the manifold panel 40 to block heat inside of the plurality of burners 11 from being delivered to the manifold panel 40. The barrier 70 may be formed of a plate type material corresponding to an open shape of the manifold panel 40, and may be bent a plurality of times.

A placement unit or device 71 may be formed on the barrier 70, on which the drain-pan bracket 60 may be placed or located. That is, the placement device 71 may be formed at a top end of the barrier 70, and extend to a height corresponding to the drain-pan bracket 60 such that the drain-pan bracket 60 may be located thereon. For example, the placement device 71 may be in the form of a step or shelf.

Engagement holes 711 may be formed in the placement device 71, with which the screws S sequentially passing through the drain-pan bracket 60 and the gasket 50 to fix the drain-pan bracket 60 and the gasket 50 may be engaged. Thus, the barrier 70, the drain-pan bracket 60, and the gasket 50 may be fixed on the front surface 121 of the top plate 12 through the screws S engaged with the engagement holes 711 while passing through the engagement holes 711, such that they are pressurized to be closely adhered to one another.

The manifold panel 40 may be formed of a metal material, and a portion of a top surface thereof may be tilted so that the plurality of knobs 41 may be easily manipulated. A space may be formed in the manifold panel 40, in which valves opened/closed by the plurality of knobs 41 or elements configured to rotate the plurality of knobs 41 may be accommodated.

Open rear surfaces of the plurality of knobs 41 may be shielded by the barrier 70. The manifold panel 40 may be formed to hide the barrier 70, the drain-pan bracket 60, and the gasket 50 in front of the top plate 12. Further, the manifold panel 40 may be fixedly coupled onto the top plate 12 or the case 21 via an additional coupling means.

An assembly structure according to an embodiment as described above will be described with reference to the accompanying drawings hereinafter.

Figure 6:
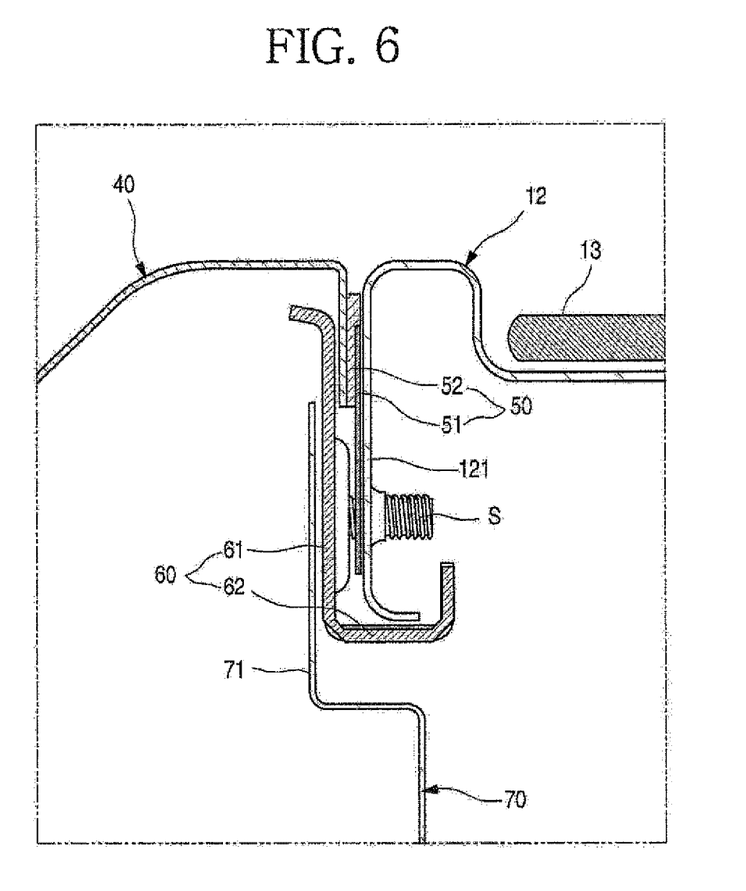
FIG. 6 is a cross-sectional view taken along line VI-VI' of FIG. 1.

FIG. 6 is a cross-sectional view taken along line VI-VI' of FIG. 1. As illustrated in FIG. 6, first, the gasket 50 may be placed on the front surface 121 of the top plate 12. In this case, the gasket 50 may be temporarily fixed on the front surface 121 of the top plate 12 by inserting the fixing protrusions 123 that protrudes from the front surface 121 of the top plate 12 into the fixing holes 512 formed in the gasket 50.

In this state, the barrier 70, the drain-pan bracket 60, and the gasket 50 may be fixed by engaging the screws S with the drain-pan bracket 60 in a state in which the drain-pan bracket 60 is placed on the placement device 71 of the barrier 70. The barrier 70, the drain-pan bracket 60, and the gasket 50 may be closely adhered to one another by fixing them via the screws S.

In this case, the gasket 50 may be pressurized and thus the close-contact member 52 of the gasket 50 may completely hermetically seal the top plate 12 and the drain-pan bracket 60, thereby perfectly preventing a foreign substance from penetrating between the top plate 12 and the manifold panel 40.

A cooker with a gasket according to the above embodiment may be included in various other embodiments.

Figure 8:
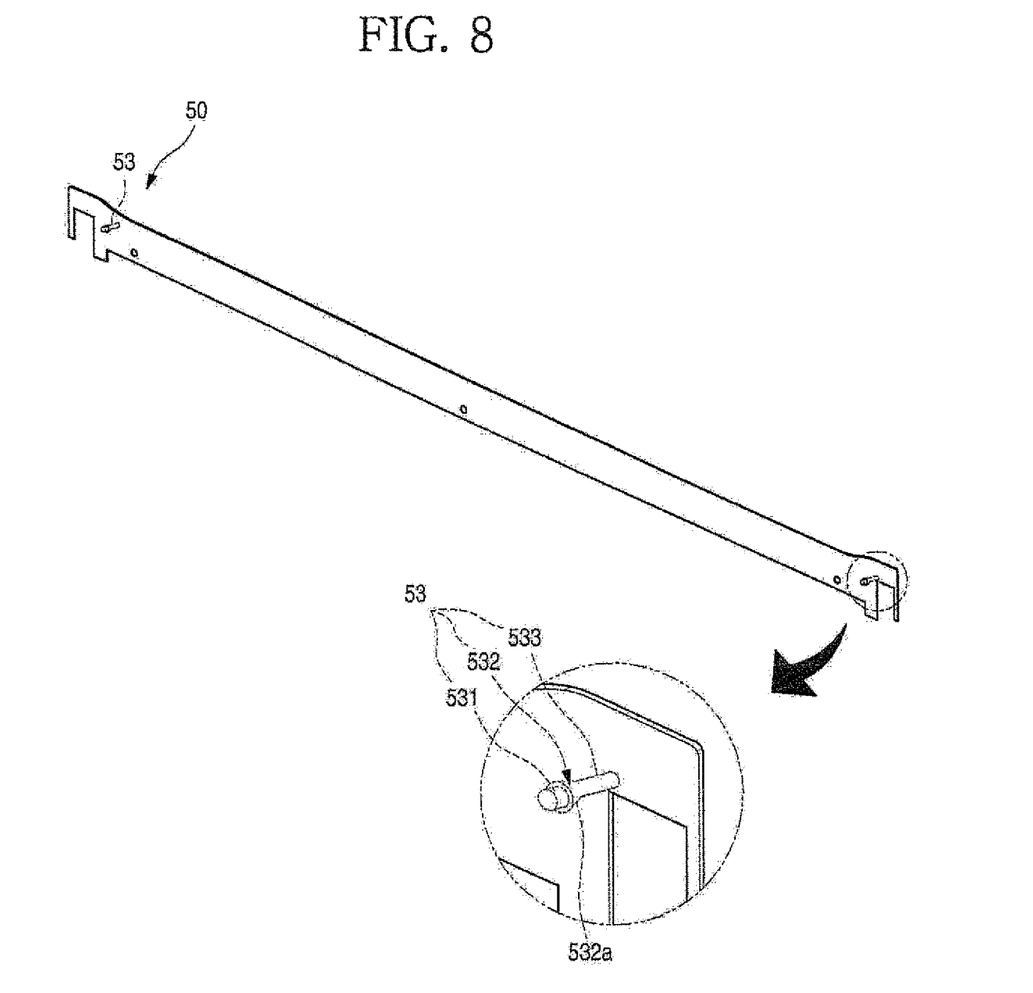
FIG. 8 is a perspective view of a gasket according to another embodiment.

According to another embodiment, the entire gasket 50 may be formed of an elastic material, and one or more fixing device 53, which may be pressed in and fixed to the top plate 12 may be formed on the gasket 50, thereby stably fixing the gasket 50.

Another embodiment will be described with reference to the accompanying drawings hereinafter. This embodiment may be substantially the same as the previous embodiment except for a structure of gasket 50, and thus, elements that are the same as those of the previous embodiment have been assigned the same reference numerals and repetitive description has been omitted.

Figure 7:
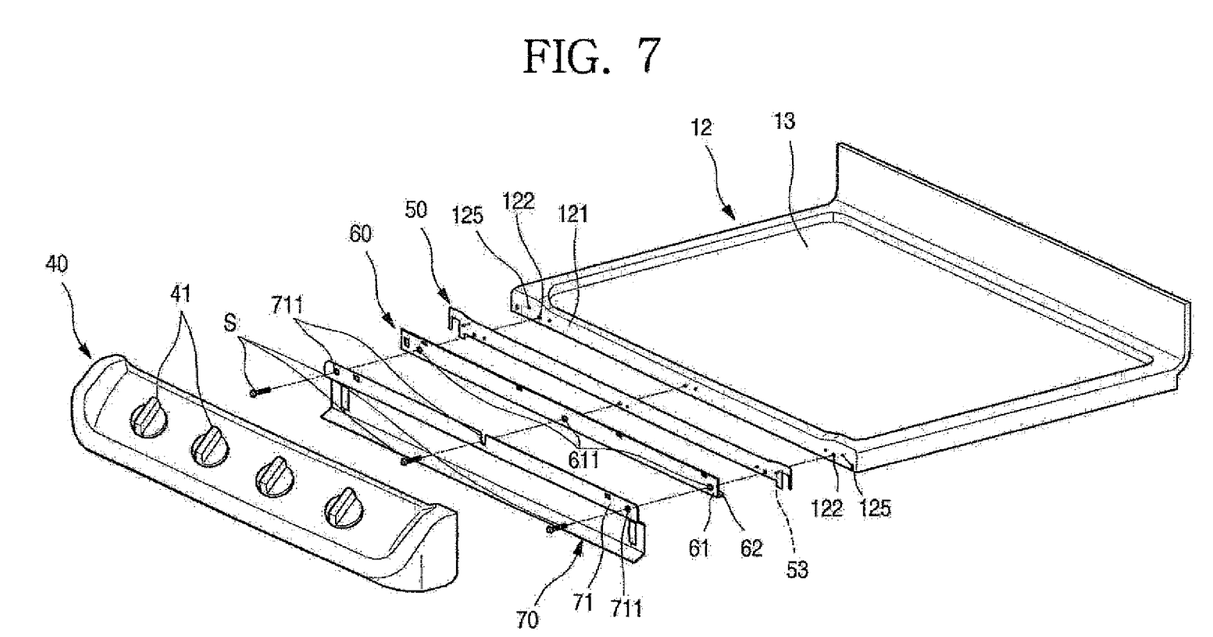
FIG. 7 is an exploded perspective view of a structure in which a top plate and a manifold panel of a cooker according to another embodiment are coupled to each other.
Figure 9:
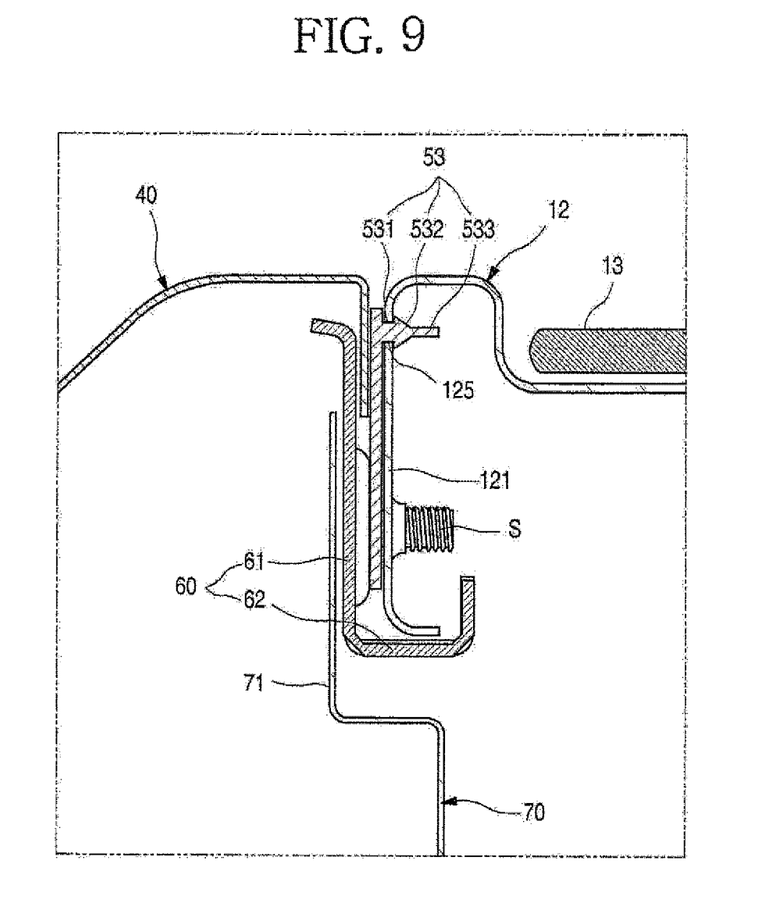
FIG. 9 is a cross-sectional view illustrating a state in which the gasket of FIG. 8 is installed.

FIG. 7 is an exploded perspective view of a structure in which a top plate and a manifold panel of a cooker according to another embodiment are coupled to each other. FIG. 8 is a perspective view of a gasket according to another embodiment. FIG. 9 is a cross-sectional view illustrating a state in which the gasket of FIG. 8 is installed.

As illustrated in FIG. 7, cooker 1 with gasket 50 according to another embodiment may include top plate 12 and manifold panel 40. The gasket 50, drain-pan bracket 60, and barrier 70 may be provided between front surface 121 of the top plate 12 and the manifold panel 40. The barrier 70, the drain-pan bracket 60, and the gasket 50 may be fixed on the front surface 121 of the top plate 12 by being sequentially passed through by screws S. The gasket 50 may completely hermetically seal the front surface 121 of the top plate 12 and the manifold panel 40 by pressurizing the gasket 50 by engaging the gasket 50 with the front surface 121 of the top plate 12 via the screws S.

The gasket 50 may be formed in a plate shape and using an elastically deforming material, such as rubber, silicone, or urethane, for example, and have a size and a width appropriate to be located in an inner region of the front surface 121 of the top plate 12. Front and rear surfaces of the gasket 50 may be formed to be respectively closely adhered to the front surface 121 of the top plate 12 and the drain-pan bracket 60, respectively.

A plurality of fixing devices 53 may protrude from the rear surface of the gasket 50 in a lengthwise direction of the gasket 50. A protrusion portion or protrusion 531 of each of the plurality of fixing devices 53 may be injection formed together with the gasket 50 to be integrally formed with the gasket 50 during molding of the gasket 50.

The plurality of fixing devices 53 may be configured to fix the gasket 50 before the gasket 50 is completely coupled to the front surface 121 of the top plate 12 via the screws S, and may be provided at a same height in a lengthwise direction of the gasket 50. That is, a pair of fixing devices 53 may be provided on both of first and second (left and right in the drawing) sides of the rear surface of the gasket 50.

The pair of fixing devices 53 may each include the protrusion portion 531 that extends from the rear surface of the gasket 50, a confinement portion 532 formed on an end portion of the protrusion portion 531 to be larger than a diameter of the protrusion portion 531, and an extension portion or extension 533 further extending from an end portion of the confinement portion 532. The protrusion 531 may have a diameter corresponding to one of insertion holes 125 formed in the front surface 121 of the top plate 12, and to correspond to a thickness of the top plate 12.

The confinement portion 532 may be formed on or at a top end of the protrusion 531, such that a diameter of an end portion thereof which is in contact with the protrusion 531 is larger than the diameter of the protrusion 531 and each of the insertion holes 125 and tapers rearward. Thus, an extending end portion of the protrusion 531 may be smaller than the diameter of each of the insertion holes 125. A circumference of the confinement portion 532 may form an inclined surface 532a.

The extension 533 that extends in a direction in which the plurality of fixing devices 53 extend may be formed on an end portion of the confinement portion 532. A diameter of the extension 533 may be the same as a diameter of the end portion of the confinement portion 532 and may be smaller than a diameter of each of the insertion holes 125.

Thus, in order to install the gasket 50, first, the gasket 50 may be disposed on the front surface 121 of the top plate 12 and the extension 533 may be inserted into one of the insertion holes 125. When the extension 533 inserted into the top plate 12 is pulled, the confinement portion 532 may be elastically deformed and then pass through the insertion hole 125 of the top plate 12. In this case, as the confinement portion 532 includes the inclined surface 532a, the confinement portion 532 may be more effectively inserted into the insertion hole 125. Further, the confinement portion 532 may completely pass through the insertion hole 125 by elastically deforming the confinement portion 532 by pulling the extension 533.

When the extension 533 is not further pulled in a state in which the confinement portion 532 completely passes through the insertion hole 125, the confinement portion 532 may return to an original state thereof. Thus, the protrusion 531 may be inserted into the insertion hole 125 and the confinement portion 532 may pass through the insertion hole 125 and then be closely adhered onto a circumference of the insertion hole 125.

Thus, the gasket 50 may be continuously fixed onto the front surface 121 of the top plate 12 and be closely adhered to the front surface 121 of the top plate 12. In this state, when the drain-pan bracket 60 and the barrier 70 are provided on the gasket 50 and the screws S are engaged with the barrier 70, the drain-pan bracket 60, and the gasket 50 to sequentially pass through them, the gasket 50 may completely hermetically seal the front surface 121 of top plate 12 and the manifold panel 40.

Although not described here in detail, the confinement portion 532 according to another embodiment may be also formed on the gasket 50 according to the previous embodiment.

According to the exemplary embodiments discussed herein, at least the following advantages may be expected.

First, a gasket may be provided along a gap between a top plate and a manifold panel, which are long in length and through which foreign substances frequently penetrate, to block penetration of foreign substances. Thus, an inside of a cooker may be prevented from being polluted and may be easily cleaned.

Second, due to a support plate of the gasket, the gasket may be prevented from being deformed even when the gasket is installed in a long gap, and prevented from being torn or deformed when the gasket is in contact with another element or is pushed by another element. Thus, after the gasket is assembled, the gap may be completely hermetically sealed.

Third, a close-contact member formed of an elastic material may be provided on the support plate, and thus, a gap may be completely hermetically sealed while maintaining a shape of the support plate, thereby improving an air-tightness performance of the gasket. Fourth, as a plurality of fixing devices coupled to an object which is in contact with the gasket may be formed on the gasket, the gasket having a long shape may have a more stable coupling structure and the air-tightness performance thereof may be improved. Fifth, a drain-pan bracket may be provided to be in contact with the gasket, and thus, a foreign substance, such as water, which may penetrate a gap in the gasket may be induced to flow to sides of the gasket, thereby preventing foreign substance from penetrating an oven.

Embodiments disclosed herein are directed to a cooker with a gasket capable of effectively hermetically sealing a long gap between a top plate and a manifold panel in an assembly structure of the cooker. Embodiments disclosed herein are also directed to a cooker with a gasket, in which the gasket may be prevented from being torn, bent, or poorly sealed when the gasket is assembled to be installed in a long gap.

Embodiments disclosed herein are further directed to a cooker with a gasket, in which the gasket may have a stable coupling structure when disposed or provided in a long gap and a sealing performance of the gasket may be secured. Embodiments disclosed herein are additionally directed to a cooker with a gasket, in which the gasket which is long in length may be stably and fixedly mounted on a target object. Embodiments disclosed herein are also directed to a cooker with a gasket, in which a foreign substance penetrating via the gasket may be blocked and water or a foreign substance penetrating downward may be dispersed to the outside.

Embodiments disclosed herein provide a cooker with a gasket that may include a gasket provided along a long gap between a top plate and a manifold panel, and compressed to hermetically seal between the top plate and the manifold panel when the top plate and the manifold panel are coupled to each other. The gasket may include a support plate having a plate shape and formed of a metal material, and a close-contact member formed of an elastic material and formed along a portion of the circumference of the support plate. The close-contact member may include a close-contact portion forming an external circumference of the support plate and formed to be thicker than the support plate, and an adhesive portion adhered to the support plate.

The gasket provided in a long gap between the top plate and the manifold panel may be formed of an elastic member. A plurality of fixing units or devices configured to pass through insertion holes formed in a target object may be formed on the gasket. The gasket may be provided along a long gap between the top plate and manifold panel. A drain-pan bracket may be further provided between the gasket and the manifold panel. The drain-pan bracket may extend to below the gasket and be then bent to guide water or a foreign substance passing through the gasket to both of sides of the gasket.

Even though all the elements of the embodiments are coupled into one or operated in the combined state, embodiments are not so limited. That is, all the elements may be selectively combined with each other without departing from the scope. Further, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope as defined by the appended claims. Therefore, the embodiments should be considered in a descriptive sense only and not for purposes of limitation, and also the technical scope is not limited to the embodiments. Further, the embodiments are defined not by the detailed description but by the appended claims, and all differences within the scope will be construed as being comprised in the present disclosure.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooker with a gasket, comprising:
    a top plate under which a plurality of burners is located;
    a manifold panel provided in front of the top plate and including a plurality of knobs to control output powers of the plurality of burners; and
    the gasket extends along a front end of the top plate and is compressed between the top plate and the manifold panel to hermetically seal the top plate and the manifold panel, wherein the gasket includes:
        a support plate having a plate shape; and
        a close-contact member formed along a top end and first and second side ends of the support plate, wherein at least one evacuation unit is formed in the support plate, wherein the at least one evacuation unit is configured to couple a case forming an exterior of the cooker and the top plate to each other by a coupling member, and wherein the at least one evacuation unit is formed by cutting a part of the support plate to expose the coupling member configured to couple the case and the top plate to each other.

2. The cooker according to claim 1, wherein the support plate is formed of a metal material, and wherein the close-contact member is formed of an elastic material.

3. The cooker according to claim 1, wherein the close-contact member includes:
    a close-contact portion provided on the support plate and formed to be thicker than the support plate; and
    an adhesive portion that extends from an end portion of the close-contact portion and is adhered to one surface of the support plate.

4. The cooker according to claim 1, wherein the close-contact member is molded using an insert-injection method to be coupled to the support plate.

5. The cooker according to claim 1, further including a plurality of fixing holes formed in the support plate in a lengthwise direction of the support plate, and a plurality of fixing protrusions formed on a front surface of the top plate to be inserted into the plurality of fixing holes.

6. The cooker according to claim 1, wherein the coupling member is a screw to be coupled to the manifold panel.

7. The cooker according to claim 1, further including:
    an oven formed under the top plate such that a cooking space therein is opened or closed by an oven door.

8. The cooker according to claim 1, further including:
    a drain-pan bracket provided between the support plate and the manifold panel, wherein the drain-pan bracket extends to below the gasket and is then bent at least once, such that the drain-pan bracket guides water passing through the gasket to both of sides of the gasket.

9. The cooker according to claim 8, wherein the coupling member is a screw to be coupled to the drain-pan bracket.

10. The cooker according to claim 8, wherein a contact portion is formed on the drain-pan bracket to be closely adhered to the gasket and to extend to below the gasket, and wherein the drain-pan bracket and the gasket are fixed via screws engaged with the top plate while passing through the contact portion and the gasket.

11. The cooker according to claim 8, wherein a barrier is provided at a rear surface of the manifold panel to shield the rear surface of the manifold panel, wherein a placement device having a step is formed on the barrier, such that the drain-pan bracket and the gasket are placed thereon in a state in which the drain-pan bracket and the gasket are coupled to each other.

12. The cooker according to claim 1, wherein the gasket is formed of an elastic member, and a plurality of fixing devices is formed on one surface of the gasket in a lengthwise direction of the gasket to pass through insertion holes of the top plate.

13. The cooker according to claim 12, wherein each of the plurality of fixing devices includes:
    a protrusion that extends from one surface of the gasket and configured to pass through one of the insertion holes;
    a confinement portion that extends from an end portion of the protrusion and formed to be larger than a diameter of each of the insertion holes; and
    an extension that extends from an end portion of the confinement portion and formed to be smaller than the diameter of each of the insertion holes.

14. The cooker according to claim 13, wherein the confinement portion is formed on the end portion of the protrusion to be larger than the diameter of each of the insertion holes, and an inclined surface is formed along a circumference of the confinement portion, such that a diameter thereof tapers toward the extension.

15. The cooker according to claim 1, wherein at least one case coupling hole is formed in the top plate to couple the top plate to the case.

16. The cooker according to claim 15, wherein the at least one case coupling hole is exposed by the at least one evacuation unit.

17. The cooker according to claim 16, wherein the at least one case coupling hole is formed in first and second sides of the support plate.

18. The cooker according to claim 1, wherein the at least one evacuation unit is formed in first and second sides of the support plate.

19. A cooker with a gasket, comprising:
a top plate under which a plurality of burners is located;
a manifold panel provided in front of the top plate and including a plurality of knobs to control output powers of the plurality of burners; and
the gasket extends along a front end of the top plate and is compressed between the top plate and the manifold panel to hermetically seal the top plate and the manifold panel, wherein the gasket includes:
a support plate having a plate shape; and
a close-contact member formed along a top end and first and second side ends of the support plate, wherein at least one evacuation unit is formed in the support plate, wherein the at least one evacuation unit is configured to couple the manifold panel and the top plate to each other by a coupling member, and wherein the at least one evacuation unit is formed by cutting a part of the support plate to expose the coupling member configured to couple the manifold panel and the top plate to each other.

20. A cooker with a gasket, comprising:
a top plate under which a plurality of burners is located;
a manifold panel provided in front of the top plate and including a plurality of knobs to control output powers of the plurality of burners;
the gasket extends along a front end of the top plate and is compressed between the top plate and the manifold panel to hermetically seal the top plate and the manifold panel, and a drain-pan bracket provided between the gasket and the manifold panel, wherein the gasket includes:
a support plate having a plate shape; and
a close-contact member formed along a top end and first and second side ends of the support plate, wherein at least one evacuation unit is formed in the support plate, wherein the at least one evacuation unit is configured to couple the drain-pan bracket and the top plate to each other by a coupling member, and wherein the at least one evacuation unit is formed by cutting a part of the support plate to expose the coupling member configured to couple the drain-pan bracket and the top plate to each other.

* * * * *